United States Patent
Yamazumi et al.

(10) Patent No.: US 11,120,732 B2
(45) Date of Patent: Sep. 14, 2021

(54) DEVICE AND METHOD FOR DRIVING DISPLAY IN RESPONSE TO IMAGE DATA

(71) Applicant: SYNAPTICS INCORPORATED, San Jose, CA (US)

(72) Inventors: Kenji Yamazumi, Tokyo (JP); Hirokazu Hatayama, Tokyo (JP); Prashant Shamarao, Cupertino, CA (US); Kota Kitamura, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/794,802

(22) Filed: Feb. 19, 2020

(65) Prior Publication Data

US 2020/0184879 A1 Jun. 11, 2020

Related U.S. Application Data

(63) Continuation of application No. 15/420,599, filed on Jan. 31, 2017, now Pat. No. 10,614,747.

(51) Int. Cl.
*G09G 3/20* (2006.01)
*G06F 3/041* (2006.01)
(Continued)

(52) U.S. Cl.
CPC ......... *G09G 3/2096* (2013.01); *G06F 3/0416* (2013.01); *G09G 3/2092* (2013.01);
(Continued)

(58) Field of Classification Search
None
See application file for complete search history.

(56) References Cited

U.S. PATENT DOCUMENTS

| 5,347,322 A | 9/1994 | Levine et al. |
| 6,598,197 B1 | 7/2003 | Peterson et al. |

(Continued)

FOREIGN PATENT DOCUMENTS

| JP | 2006191188 A | 7/2006 |
| KR | 20070080491 A | 8/2007 |

(Continued)

OTHER PUBLICATIONS

International Search Report and Written Opinion, International Applicaiton No. PCT/US2017/066647 dated Apr. 20, 2018 consists of 13 pages.

(Continued)

*Primary Examiner* — Krishna P Neupane
(74) *Attorney, Agent, or Firm* — Leydig, Voit & Mayer, Ltd.

(57) ABSTRACT

A display driver includes: a receiver configured to receive image data of each line of a display panel from an external device; a line latch circuit having a line latch configured to latch the image data of each line received by the receiver in response to a strobe signal; a driving circuit section which drives the display panel in response to the image data latched by the line latch; and a timing controller configured to generate the strobe signal. The receiver is configured to detect occurrence of transmission error in data transmission about each line. The timing controller is configured to generate the strobe signal in response to a detection result of the occurrence of transmission error.

17 Claims, 17 Drawing Sheets

(51) Int. Cl.
  *G09G 3/3275* (2016.01)
  *G09G 3/36* (2006.01)
  *G09G 5/18* (2006.01)
  *G09G 5/393* (2006.01)
  *G09G 3/3225* (2016.01)

(52) U.S. Cl.
  CPC ......... *G09G 3/3275* (2013.01); *G09G 3/3685* (2013.01); *G09G 5/18* (2013.01); *G09G 5/393* (2013.01); *G06F 3/0412* (2013.01); *G09G 3/3225* (2013.01); *G09G 3/3648* (2013.01); *G09G 2310/08* (2013.01); *G09G 2320/0219* (2013.01); *G09G 2330/06* (2013.01); *G09G 2330/12* (2013.01); *G09G 2360/18* (2013.01); *G09G 2370/08* (2013.01); *G09G 2370/10* (2013.01)

(56) References Cited

U.S. PATENT DOCUMENTS

| 2004/0252115 | A1 | 12/2004 | Boireau | |
|---|---|---|---|---|
| 2005/0253833 | A1 | 11/2005 | Teshirogi et al. | |
| 2009/0213938 | A1* | 8/2009 | Lee | H04N 19/70 375/240.24 |
| 2009/0295813 | A1* | 12/2009 | Nose | G09G 3/3611 345/531 |
| 2011/0286531 | A1 | 11/2011 | Okajima | |
| 2013/0321332 | A1 | 12/2013 | Yoshimura | |
| 2015/0206492 | A1* | 7/2015 | Lee | G09G 3/3648 345/208 |
| 2016/0005345 | A1* | 1/2016 | Kubo | G09G 3/2096 345/214 |
| 2016/0104401 | A1* | 4/2016 | Ko | G09G 3/006 345/214 |
| 2017/0108970 | A1* | 4/2017 | Kim | G09G 3/2092 |

FOREIGN PATENT DOCUMENTS

| KR | 100863925 | B1 | 10/2008 |
|---|---|---|---|
| KR | 101467214 | B1 | 12/2014 |

OTHER PUBLICATIONS

International Report on Patentability, International Applicaiton No. PCT/US2017/066647 dated Aug. 15, 2019 consists of 10 pages.

* cited by examiner

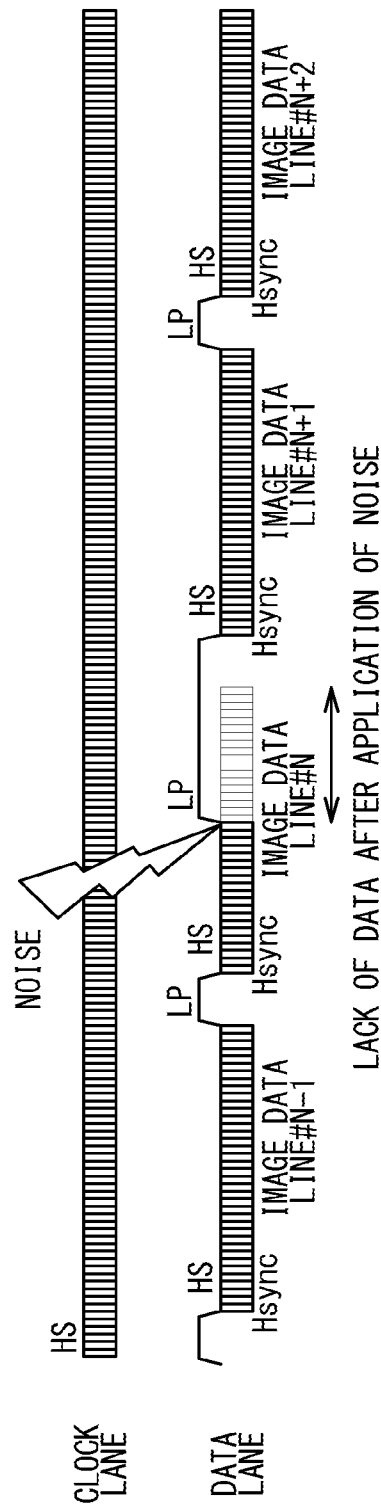

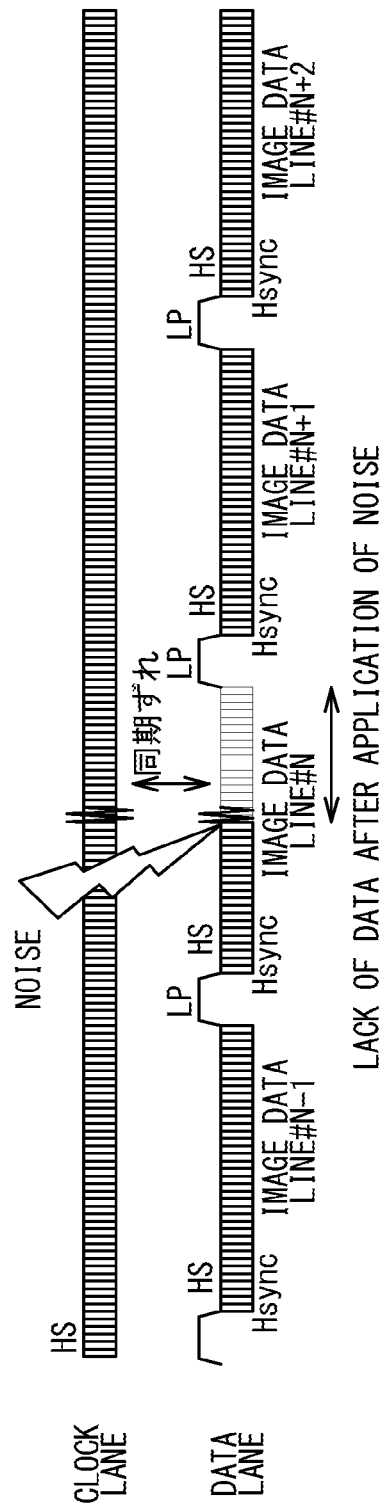

DEVICE AND METHOD FOR DRIVING DISPLAY IN RESPONSE TO IMAGE DATA

CROSS-REFERENCE TO RELATED APPLICATIONS

This application is a continuation of U.S. patent application Ser. Ser. No. 15/420,599 filed Jan. 31, 2017 of which is incorporated herein by reference in its entirety.

TECHNICAL FIELD

The present invention relates to a display driver and a display apparatus, and especially, to a technique of transmission of image data to a display driver that drives a display panel.

BACKGROUND ART

As well-known to a skilled person in the technical field, the image data corresponding to an image to be displayed on a display panel are transmitted to a display driver that drives the display panel (e.g. a liquid crystal display panel and OLED (organic light emitting diode display) panel). Typically, the image data contains data for specifying a gray scale of each pixel, and a pixel circuit of each pixel of the display panel is driven in response to the image data.

One of problems that possibly occur in case of transmission of the image data to the display driver is occurrence of transmission error when noise is applied to a transmission signal line on which the image data are transmitted. For example, when the transmission of the image data to the display driver has failed due to the transmission error, the missing of the image data occurs in the display driver. Especially, when high-voltage noise is continuously applied to the transmission line on which the image data are transmitted, the transmission of the image data corresponding to a series of pixels fails, and distortion of the display image occurs. Also, when failing in the transmission of a control packet to control the operation of the display driver in each horizontal sync period due to the transmission error, the distortion of the display image could occur.

FIG. 1 shows an example of a display screen when the high-voltage noise is continuously applied to miss the image data. When the transmission of the image data of a series of pixels of a specific line has failed, a linear image distortion occurs. A part A of FIG. 1 schematically shows the occurrence of image distortion. The occurrence of such an image distortion is not desirable. The technical needs exist to cope with the image distortion which is caused through the failure of the reception of the image data.

SUMMARY OF INVENTION

Therefore, one object of the present invention is to provide the technique to cope with the image distortion which is caused for the reason of the transmission error in the data transmission. Other objects of the present invention will be understood to the skilled person from the following disclosure.

In an embodiment, a display driver includes: a receiver configured to receive image data of each line of a display panel from an external device; a line latch circuit having a line latch configured to latch the image data of each line received by the receiver in response to a strobe signal; a driving circuit section which drives the display panel in response to the image data latched by the line latch; and a timing controller configured to generate the strobe signal. The receiver is configured to detect occurrence of transmission error in data transmission about each line. The timing controller is configured to generate the strobe signal in response to a detection result of the occurrence of transmission error.

In another embodiment, a display driver includes: a receiver configured to receive image data of each line of a display panel from an external device; a line memory circuit comprising a first memory area and a second memory area, each of which is configured to be able to store the image data for one line; a storage circuit configured to store the image data of a plurality of lines; a driving circuit section which drives the display panel in response to the image data outputted from the storage circuit; and a timing controller. The receiver is configured to detect the occurrence of transmission error in the data transmission about each line. The storage circuit is configured to output the image data received from the line memory circuit in a reception order. The line memory circuit is configured to write the image data received from the receiver in one of the first and second memory areas according to a pointer received from the timing controller, and to read the image data from the other of the first and second memory areas to transmit to the storage circuit. The timing controller is configured to generate the pointer in response to a detection result of the occurrence of transmission error.

The display driver of such a configuration is suitably used for the display apparatus.

BRIEF DESCRIPTION OF THE DRAWINGS

FIG. 4A, FIG. 4B, and FIG. 4C are timing charts showing the operation of transmitting image data to the display driver from the application processor.

DETAILED DESCRIPTION OF PREFERRED EMBODIMENTS

Figure 1:
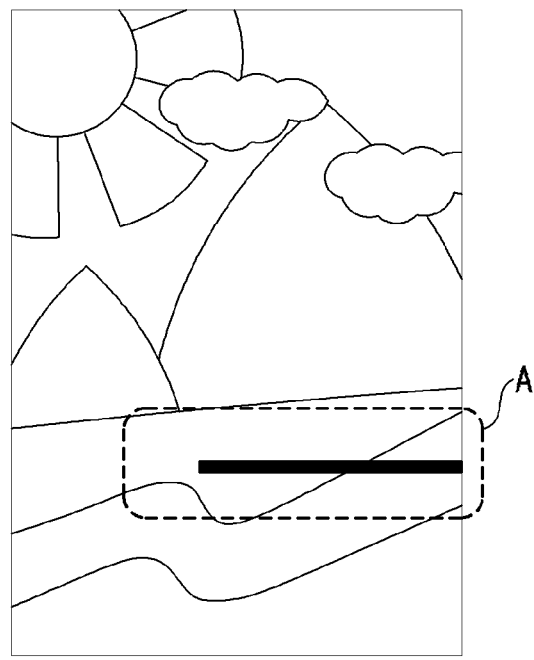
FIG. 1 is a diagram showing an example of the display screen when high-voltage noise is continuously applied to cause the missing of image data.

Hereinafter, embodiments will be described with reference to the attached drawings. Note that in the following description, an identical or corresponding component is sometimes referred an identical or corresponding reference numeral or symbol.

Figure 2:
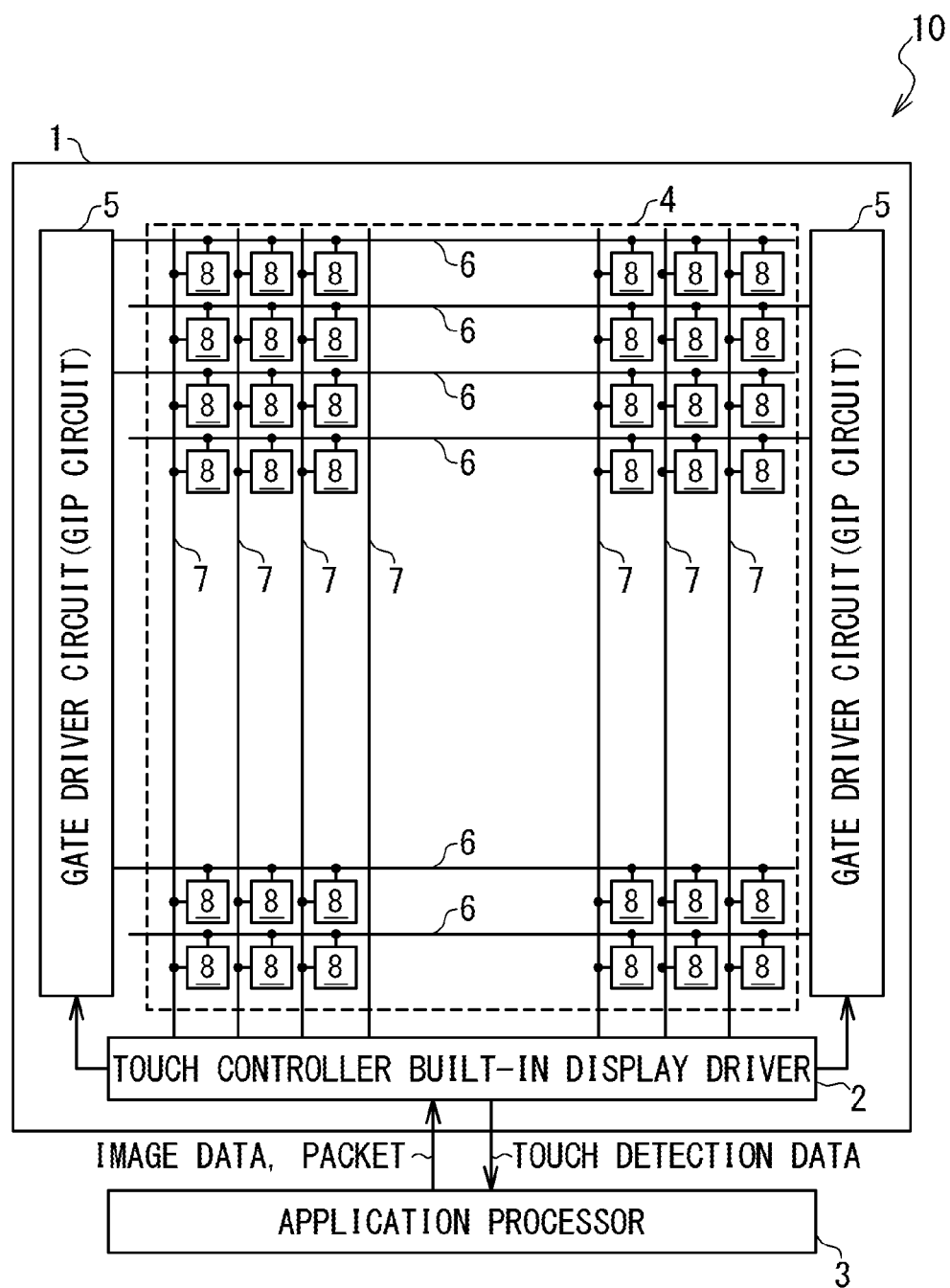
FIG. 2 is a block diagram schematically showing the configuration of a display apparatus according to an embodiment.

FIG. 2 is a block diagram schematically showing the configuration of a display apparatus 10 according to an embodiment. The display apparatus 10 includes a display panel 1 and a touch controller built-in display driver 2. The display apparatus 10 is configured to receive image data from an application processor 3 and display an image corresponding to the received image data on the display panel 1. As the display panel 1, for example, a liquid crystal display panel and an OLED display panel can be used.

In addition, the display apparatus 10 is configured to carry out the touch detection to detect a position where a conductive body (typically, a finger of the human body) touches the display panel 1. Detection electrodes (not shown) are integrated on the display panel 1 for the touch detection, and the touch detection is carried out based on the electric state of each detection electrode (typically, a capacitance).

The display panel 1 has a display area 4 and a gate driver circuit 5. A plurality of gate lines 6, a plurality of source lines 7 and a plurality of pixels 8 are arranged in the display area 4. The pixels 8 are arranged in a matrix, and each pixel 8 is disposed at the position where the corresponding gate line 6 and the corresponding source line 7 intersect, and has a pixel circuit. For example, when the display panel 1 is a liquid crystal display panel, the pixel circuit may contain a selection transistor, a pixel electrode and a pixel capacity. Also, when the display panel 1 is an OLED display panel, the pixel circuit may contain a selection transistor, a drive transistor, a pixel capacity and an organic diode device.

In the following description, there is a case that the pixels 8 connected with an identical gate line 6 are generally referred to as a "line". That is, the pixels 8 are arranged on the display panel 1 to configure a plurality of lines.

The gate driver circuit 5 drives the gate line 6 according to a control signal received from the touch controller built-in display driver 2. In the present embodiment, the gate driver circuits 5 of a pair are provided on both sides of the display area 4. The gate driver circuit 5 is integrated on the display panel 1 by a CoG (Circuit-on-Glass) technique.

The touch controller built-in display driver 2 operates as follows. At first, the touch controller built-in display driver 2 drives the source line 7 of the display panel 1 according to image data received from the application processor 3. At second, the touch controller built-in display driver 2 supplies a gate control signal to the gate driver circuit 5 to control the gate driver circuit 5. At third, the touch controller built-in display driver 2 carries out the operation of the touch detection. More specifically, the touch controller built-in display driver 2 detects the electric state (typically, a capacitance) of each detection electrode of the display panel 1, and detects a position where the conductive body touches the display panel 1 based on the detected electric state of each detection electrode. When the touch detection of a self-capacitance type is carried out, the touch controller built-in display driver 2 detects a mutual capacitance formed between the drive electrode and the detection electrode, and detects the position where the conductive body touches the display panel 1, from the detected mutual capacitance. When the touch detection of a mutual capacitance type is carried out, the touch controller built-in display driver 2 detects the mutual capacity formed between the drive electrode and the detection electrode and detects the position where the conductive body touches the display panel 1, from the detected mutual capacity. In the following description, the touch controller built-in display driver 2 is merely referred to as "the display driver 2", for simplification of the description.

The operation of the display driver 2 is controlled according to a control packet received from an application processor 3. As the control packet, for example, packets are given such as packets used for the control of operation timing of the display driver 2 (e.g. a Vsync Start packet which specifies start timing of a vertical sync (synchronization) period and a Hsync Start packet which specifies start timing of a horizontal sync period) and a packet stored with a command to control the operation of the display driver 2.

Figure 3:
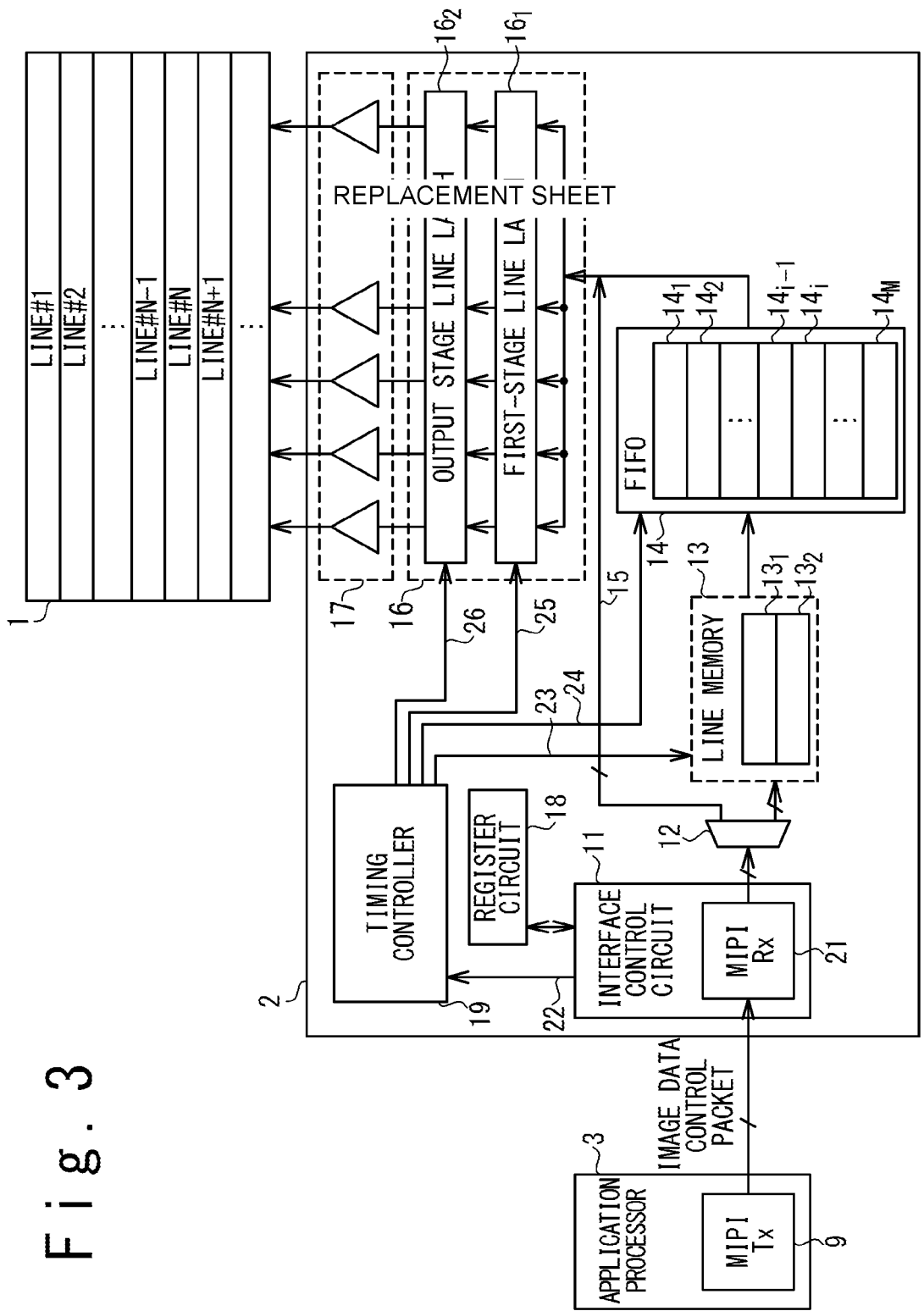
FIG. 3 is a block diagram schematically showing the configuration of a display driver and an application processor according to the present embodiment, which are related to the operation of displaying an image on a display panel.

FIG. 3 is a block diagram schematically showing the configuration that relates to the operation of displaying an image on the display panel 1, of the display driver 2 and the application processor 3 according to the present embodiment. In the present embodiment, the transmission of image data and control packets to the display driver 2 from the application processor 3 is carried out based on MIPI DSI (Mobile Industry Processor Interface Display Serial Interface). The application processor 3 has an MIPI transmitter 9, and the image data and the control packets which are generated by the application processor 3 are transmitted to the display driver 2 by the MIPI transmitter 9.

The display driver 2 includes an interface control circuit 11, a selector 12, a line memory circuit 13, a FIFO circuit 14, a bypass data bus 15, a line latch circuit 16, a source driver circuit 17, a register circuit 18, and a timing controller 19.

The interface control circuit 11 has an MIPI receiver 21, and receives the image data and the control packets from the application processor 3 by using the MIPI receiver 21. The interface control circuit 11 transmits the received image data to the selector 12, and interprets the received control packet to control each circuit contained in the display driver 2.

The MIPI receiver 21 has a function to detect the transmission error in the data transmission to the display driver 2 from the application processor 3, and generates a transmission error detection signal 22 according to the detection result of transmission error. When detecting the transmission error in case of transmission of image data of some line to the display driver 2, the MIPI receiver 21 activates the transmission error detection signal 22. As described later, when the transmission error is detected by the MIPI receiver 21, the display driver 2 operates to restrain an image distortion.

The selector 12, the line memory circuit 13, the FIFO circuit 14 and the bypass data bus 15 configures a transmission circuit group to transmit the image data received from interface control circuit 11 to the line latch circuit 16.

In detail, the selector 12 transmits the image data received from the interface control circuit 11 to the line memory circuit 13 or the line latch circuit 16.

The line memory circuit 13 temporarily stores the image data received from the selector to transmit to the FIFO circuit 14. In the present embodiment, the line memory circuit 13 is configured to store the image data of pixels 8 for one line, and has memory areas $13_1$ and $13_2$, each of which is configured to store the image data of pixels 8 for one line.

The image data sent from the interface control circuit 11 to the line memory circuit 13 is written in which of the memory areas $13_1$ and $13_2$, and the image data transmitted to the FIFO circuit 14 is read from which of the memory areas $13_1$ and $13_2$ of the line memory circuit 13. Which of the memory areas $13_1$ and $13_2$ is accessed is specified based on a pointer 23 supplied from the timing controller 19. The pointer 23 takes two states. When the pointer 23 is in a first state (for example, when the value of the pointer 23 is "0"), the image data transmitted from the interface control circuit 11 to the line memory circuit 13 is written in the memory area $13_1$, and the image data stored in the memory area $13_2$ is sent to the FIFO circuit 14. On the other hand, when the pointer 23 is in a second state (for example, when the value of the pointer 23 is "1"), the image data sent from the interface control circuit 11 to the line memory circuit 13 is written in the memory area $13_2$, and the image data which has been stored in memory area $13_1$ is sent to the FIFO circuit 14.

The FIFO circuit 14 temporarily stores the image data received from the line memory circuit 13 to transmit to the line latch circuit 16. The FIFO circuit 14 has a predetermined number of memory areas 141 to 14M configured to each store the image data of pixels 8 for one line. The FIFO circuit 14 is configured to receive the image data of each line from the line memory circuit 13, and to transmit the image data to the line latch circuit 16 in a reception order. The timing control signal 24 is supplied to the FIFO circuit 14 from the timing controller 19, and the operation timing of the FIFO circuit 14 is controlled in response to the timing control signal 24. Note that a memory circuit may be used to store the image data of the pixels 8 for a plurality of lines instead of the FIFO circuit 14. For example, a frame memory may be used to store the image data for one frame, instead of FIFO circuit 14.

The bypass data bus 15 is used to bypass the line memory circuit 13 and the FIFO circuit 14 in the transmission of the image data to the line latch circuit 16.

The image data outputted from the interface control circuit 11 is transmitted to the line latch circuit 16 through the line memory circuit 13 and the FIFO circuit 14, or transmitted to the line latch circuit 16 through the bypass data bus 15, according to an operation mode of the display driver 2. In the operation mode to make the line memory circuit 13 and the FIFO circuit 14 operate, the image data is transmitted to the line latch circuit 16 through the line memory circuit 13 and the FIFO circuit 14. On the other hand, in the operation mode to pause the line memory circuit 13 and the FIFO circuit 14, the image data bypasses the line memory circuit 13 and the FIFO circuit 14 and is transmitted to the line latch circuit 16 through the bypass data bus 15.

The line latch circuit 16 stores the image data received through the FIFO circuit 14 or the bypass data bus 15. The line latch circuit 16 has a first-stage line latch $16_1$ and an output stage line latch $16_2$. The first-stage line latch $16_1$ is used to receive the image data from the FIFO circuit 14 or the bypass data bus 15, and the output stage line latch $16_2$ is used to store the image data used to drive the source lines 7. The first-stage line latch $16_1$ and the output stage line latch $16_2$ are each configured to store the image data of pixels 8 for one line. The image data sequentially transmitted to the line latch circuit 16 from the FIFO circuit 14 or the bypass data bus 15 is sequentially stored in the first-stage line latch $16_1$ in synchronization with a timing control signal 25 supplied from the timing controller 19. On the other hand, a strobe signal 26 is supplied from the timing controller 19 to the output stage line latch $16_2$, and the output stage line latch $16_2$ latches the image data of pixels 8 for one line from the first-stage line latch $16_1$ at a time, when the strobe signal 26 is activated. The image data of pixels 8 of each line received by the MIPI receiver 21 is finally transmitted to the output stage line latch $16_2$ and used to drive the source lines 7. The strobe signal 26 is activated before the start of each horizontal sync period in which the operation of driving the pixels 8 is carried out, and in the horizontal sync period in which the pixels 8 of some line are driven, the pixels 8 of the line are driven according to the image data stored in the output stage line latch $16_2$ in the horizontal sync period.

The source driver circuit 17 operates as a drive circuit section which drives the pixels 8 of the display panel 1 according to the image data stored in the output stage line latch $16_2$ of the line latch circuit 16. In each horizontal sync period in which the operation of driving the pixels 8 is carried out, the pixels 8 of the line selected in the horizontal sync period are driven.

The register circuit 18 and the timing controller 19 configure a control circuit section used for the control of the operation of the display driver 2. The register circuit 18 stores the register value that is used for the control of the operation of the display driver 2. The application processor 3 is accessible to the register circuit 18, and the register value stored in the register circuit 18 is rewritable by the application processor 3. The timing controller 19 controls the operation timing of the display driver 2 according to a command held in the control packet received from the application processor 3 and the register value stored in the register circuit 18. For example, the timing controller 19 supplies the pointer to the line memory circuit 13, supplies the timing control signal 24 to the FIFO circuit 14, and supplies the timing control signal 25 and the strobe signal 26 to the line latch circuit 16.

Here, note that the timing controller 19 is configured to generate the pointer 23 and the strobe signal 26 according to the transmission error detection signal 22 received from the MIPI receiver 21. As could be understood from the following consideration, it is useful for the purpose of restraining an image distortion caused by the transmission error in the data transmission that the pointer 23 and the strobe signal 26 are generated in response to the transmission error detection signal 22.

Below, the operation of the display apparatus 10 will be described.

Figure 4A:
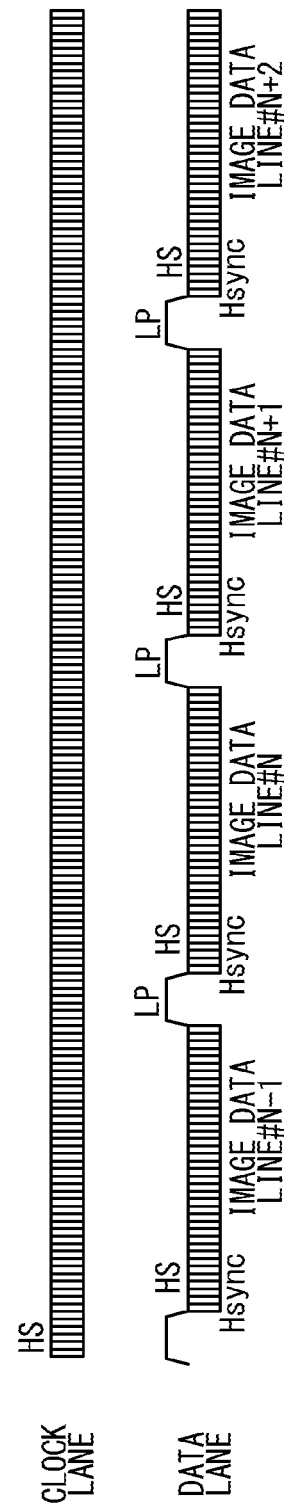

FIG. 4A to FIG. 4C are timing charts showing the operation of transmitting the image data to the display driver 2 from the application processor 3. In FIG. 4A to FIG. 4C, the operation of transmitting the image data of the line #N−1 to the line #N+2 (strictly, the image data of the pixels 8 of the lines #N−1 to #N+2) is shown. As mentioned above, in the present embodiment, the transmission of the image data from the application processor 3 to the display driver 2 is carried out in conformity to MIPI DSI.

In the data communication based on MIPI DSI, two kinds of transmission lines: one clock lane and at least one data lane are used. In the display apparatus 10 of the present embodiment, this means that the MIPI transmitter 9 of the application processor 3 and the MIPI receiver 21 of the display driver 2 are connected by the clock lane and at least 1 data lane. The clock lane is used to transmit a differential clock signal, and the data lane is used to transmit a differential data signal.

Also, two communicate modes: HS (high speed) mode and LP (low power) mode are prepared for data communication by the MIPI DSI. The HS mode is a communicate mode to carry out data transmission at high speed, and the LP mode is the communicate mode to carry out data transmission at low speed but low power consumption. When the data transmission is carried out in the HS mode, the differential clock signal is supplied to the receiver through the clock lane. The receiver latches the differential data signal transmitted on the data lane in synchronization with a differential clock signal supplied through the clock lane, to receive data transmitted by the differential data signal. On the other hand, when the data transmission is carried out in the LP mode, the data signal in which a clock was embedded is transmitted to the receiver through the data lane. The receiver carries out clock reproduction to the data signal to generate a clock signal, and latches the data signal in synchronization with the reproduced clock signal. The clock lane does not participate in the data transmission in the LP mode.

Note that the switching of the communication mode is permitted to individually carry out to the clock lane and the data lane. When the data transmission is carried out in the HS mode, both of the clock lane and the data lane are set to the HS mode. On the other hand, when the data transmission is carried out in the LP mode, the data lane is set to the LP mode but it is not necessary that the clock lane is set to the LP mode.

FIG. 4A shows the operation when the image data of the lines #N−1 to #N+2 are normally transmitted. It is supposed that the clock lane is set to the HS mode and the data lane is set to the LP mode immediately before the transmission of the image data of the line #N−1 is started. The explanatory remark "HS" of FIG. 4A shows the HS mode and the explanatory remark "LP" shows the LP mode.

When the image data of the line #N−1 are transmitted, the data lane is first set to the HS mode. Next, a Hsync Start packet is transmitted by the data lane. The Hsync Start packet is shown by the explanatory remark "Hsync" in FIG. 4A. After that, the image data of the line #N−1 are transmitted through the data lane. When the data transmission of the image data completes, the data lane is returned to the LP mode. The transmission of the image data of the lines #N to #N+2 is carried out in the similar procedure.

FIG. 4B and FIG. 4C show the operation when noise is applied to the data lane in the case of the transmission of the image data of the line #N. When noise is applied to the data lane, various phenomena which obstruct the data transmission in the data lane can happen.

Since the switching of the communication mode of the data lane in MIPI DSI is carried out by the transition of the signal level of the transmission lines which configure the data lane, the data lane is sometimes changed from the HS mode to the LP mode, as shown in FIG. 4B, when noise is applied to the data lane. In this case, the transmission of a portion of the image data supplied after application of the noise, of the image data of the line #N is not carried out, and a distortion of the image data occurs in the display driver 2.

The distortion of the image data causes a linear image distortion as shown in FIG. 1.

Also, as in FIG. 4C, a synchronization loss sometimes occurs between the clock lane and the data lane through the application of the noise. In this case, the transmission of a portion of the image data supplied after application of the noise, of the image data of the line #N is not carried out, and a distortion of the image data occurs in the display driver 2. The distortion of the image data causes a linear image distortion as shown in FIG. 1.

Below, a technique to properly cope with the occurrence of the image distortion when the transmission error occurs will be described.

In order to properly cope with the occurrence of transmission error in the data transmission to the display driver 2 from the application processor 3, it is first desirable to detect the occurrence of transmission error. Below, the detection of occurrence of transmission error in the present embodiment will be described.

As mentioned above, in the present embodiment, the image data of each line is transmitted to the MIPI receiver 21 of the display driver 2 from the MIPI transmitter 9 of the application processor 3. In the present embodiment, the MIPI receiver 21 is configured to detect the occurrence of transmission error of the data.

Figure 5:
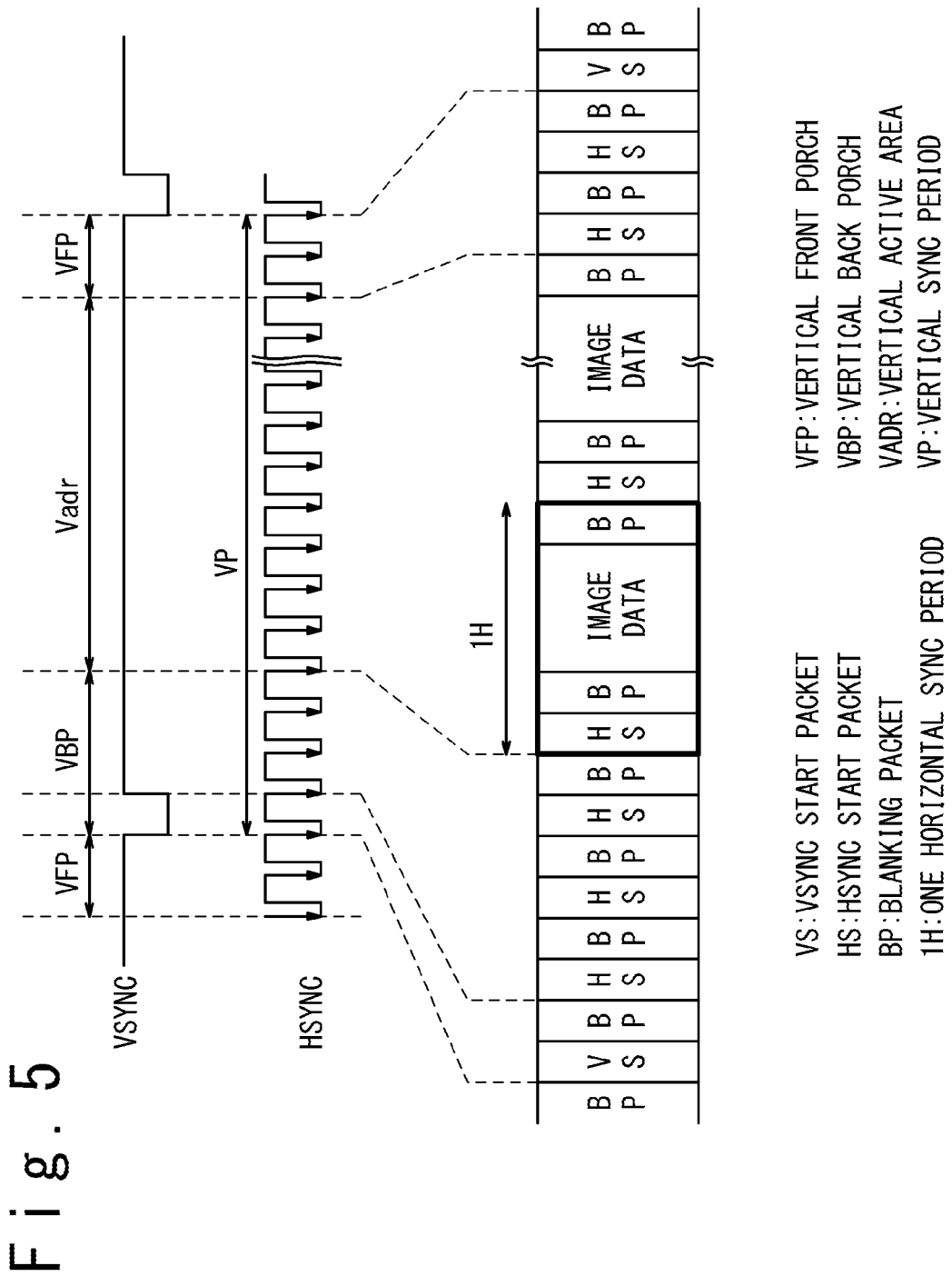
FIG. 5 is a conceptual diagram showing a format of a data stream transmitted to the display driver from the application processor.

In the present embodiment, the MIPI receiver 21 is configured to detect the occurrence of transmission error by using an error detection code which is contained in the data transmitted from the application processor 3 to the display driver 2. FIG. 5 is a conceptual diagram showing the format of a data stream sent from the application processor 3 to the display driver 2. In FIG. 5, "VSYNC" shows a vertical sync signal generated in the display driver 2, and "HSYNC" shows a horizontal sync signal.

Each vertical sync period VP contains a vertical back porch period VBP, a vertical active area Vadr, and a vertical front porch period VFP.

When each vertical sync period is started, a Vsync Start packet is transmitted to the display driver 2 from the application processor 3. When each horizontal sync period is started, a Hsync Start packet is transmitted to the display driver 2 from the application processor 3. In FIG. 5, the Vsync Start packet is shown by a symbol "VS" and the Hsync Start packet is shown by a symbol "HS". Also, a symbol "BP" shows a blanking packet, namely, a packet sent from the application processor 3 to the display driver 2 when data to be sent to the display driver 2 does not exist. In each horizontal sync period of the vertical active area Vadr, the image data are transmitted to the display driver 2 from the application processor 3.

Figure 6A:
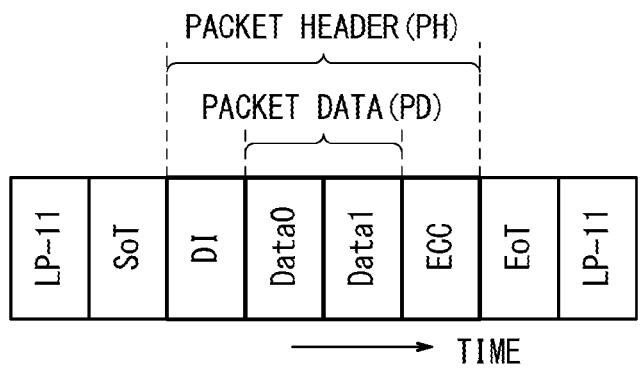
FIG. 6A is a diagram showing the format of a short packet.
Figure 6B:
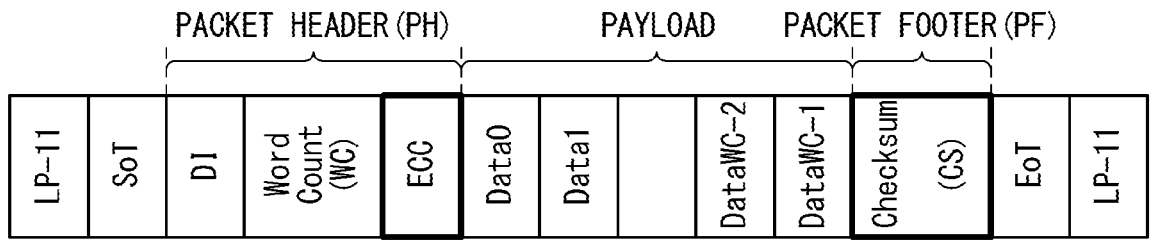
FIG. 6B is a diagram showing the format of a long packet.

FIG. 6A and FIG. 6B are diagrams showing the formats of the packet sent from the application processor 3 to the display driver 2 in the HS mode. In the MIPI DSI, packets having two kinds of formats, specifically, a short packet and a long packet are used for the transmission of data. FIG. 6A shows the format of the short packet, and FIG. 6B shows the format of the long packet. The short packet is a packet in which the payload length is short and is fixed. The above-mentioned control packet used to control the operation of the display driver 2, more specifically, the Vsync Start packet and the Hsync Start packet are transmitted as the short packets. The long packet is a packet in which payload length is variable. The image data is stored in the long packet and is transmitted.

In the MIPI DSI, immediately before and after the transmission of the packet on the data lane in the HS mode, two signal lines which configure the transmission lines of the data lane are set to a specific state, more specifically, the two concerned signal line are both set to the state of data "1". In FIG. 6A and FIG. 6B, the specific state is shown as the explanatory remark "LP-11".

As shown in FIG. 6A, the short packet contains SoT (Start of Transmission), a packet header and EoT (End of Transmission). The packet header contains a data identifier DI, packet data Data0 and Data1, and ECC (error correction code). The data identifier DI shows a kind of the data contained in the short packet. The packet data Data0 and Data1 are data to be sent by the short packet. ECC is used for the error detection and correction of the packet header.

On the other hand, as shown in FIG. 6B, the long packet (a packet for storing image data) contains SoT (Start of Transmission), a packet header, packet data, a packet footer and EoT (End of Transmission).

The packet header contains the data identifier DI showing a kind of the packet, a word count (WC), and ECC. The data identifier DI indicates a kind of data contained in the long packet. The word count indicates the number of packet data contained in the long packet. ECC is used for the error detection and correction of the packet header.

The payload contains the packet data of the number indicated by the word count. The image data (display data) are stored in the payload as the packet data.

The packet footer contains an error detection code used for the error detection of the packet data which are contained in the payload. In the MIPI DSI, it is prescribed that a checksum is used as an error detection code contained in the packet footer.

In the present embodiment, the MIPI receiver 21 detects the transmission error using the ECC contained in the packet headers of the short packet and the long packet, and the checksum contained in the packet footer of the long packet. In detail, the MIPI receiver 21 detects the occurrence of transmission error of each line in case of transmission of the Hsync Start packet as the short packet and the long packet which transmits the image data. Note that the MIPI receiver 21 may avoid the occurrence of transmission error by carrying out an error correction when detecting the occurrence of correctable transmission error in the packet header by the ECC. In the MIPI DSI, the ECC contained in the packet header is generated to be able to correct a 1-bit error in the packet header.

In addition, the MIPI receiver 21 may be configured to detect the occurrence of transmission error based on the state of the clock lane and the state of the data lane in case of transmission of the long packet which accommodates the image data. As mentioned above, since the long packet accommodating the image data is transmitted in the HS mode, it is necessary to maintain the clock lane and the data lane in the HS mode until the transmission of the long packet completes. When it is detected that the state of the clock lane or the data lane has been switched to the LP mode before the transmission of the long packet in the data lane completes, the MIPI receiver 21 determines that the transmission error has occurred.

When the MIPI receiver 21 detects the occurrence of transmission error, the display driver 2 operates to cope with the image distortion which is caused by the transmission error. More specifically, when the occurrence of transmission error is detected in the data transmission about some line (sometimes to be referred to as an "object line" below), the display driver 2 in the present embodiment drives the pixels 8 of the object line based on the image data of the line of about which the data transmission has been carried out immediately before the data transmission about the object line (hereinafter, to be sometimes referred to as an "immediately previous line"). Because an image displayed on the display panel 1 often continues in the upper and lower direction (a direction to which the source line 7 extends) generally, an image distortion which is actually recognized by a viewer of the display panel 1 can be restrained by using the image data of the immediately previous line instead of the image data of the object line in case of driving the pixels 8 of the object line. In the following description, the operation of coping with the image distortion which is carried out by the display driver 2 of the present embodiment will be described in detail.

The display driver 2 of the present embodiment has at least three operation modes: the touch detection inexecution mode, the V blank touch detection mode and a long H touch detection mode.

Figure 7A:
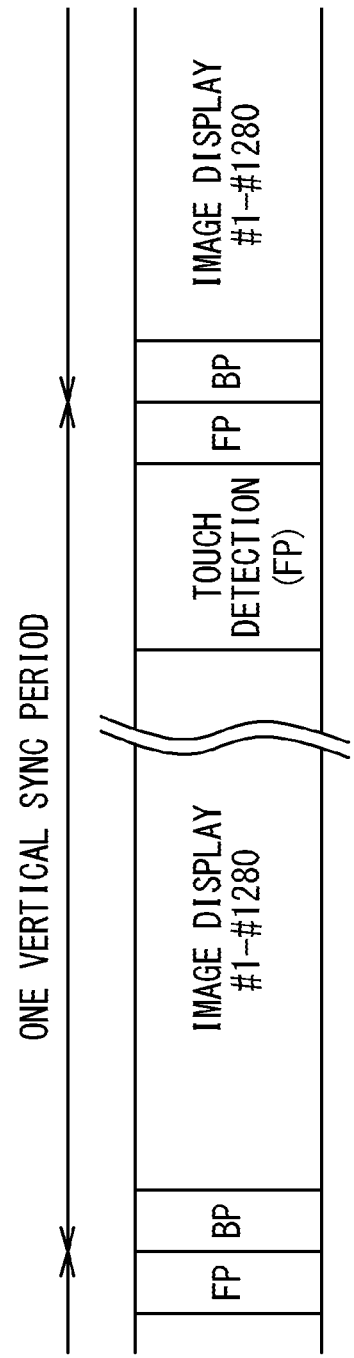
FIG. 7A is a timing chart showing the operation of the display driver in a touch detection inexecution mode and a V blank touch detection mode.

The touch detection inexecution mode is an operation mode in which touch detection is not carried out, the V blank touch detection mode is an operation mode in which the touch detection is carried out in the vertical blanking period of each vertical sync period. FIG. 7A is a timing chart showing the operation of the display driver in the touch detection inexecution mode and the V blank touch detection mode. Each vertical sync period has a vertical back porch period (BP), an image display period and a vertical front porch (FP) period. FIG. 7A shows the operation of the display driver 2 when the display panel 1 has 1280 lines and, therefore, the image display period has 1280 horizontal sync periods. In the touch detection inexecution mode, the touch detection is not carried out. In the V blank touch detection mode, the touch detection is carried out in the vertical blanking period, especially, in the vertical front porch (FP) period of the vertical blanking period in the operation shown in FIG. 7A.

Figure 7B:
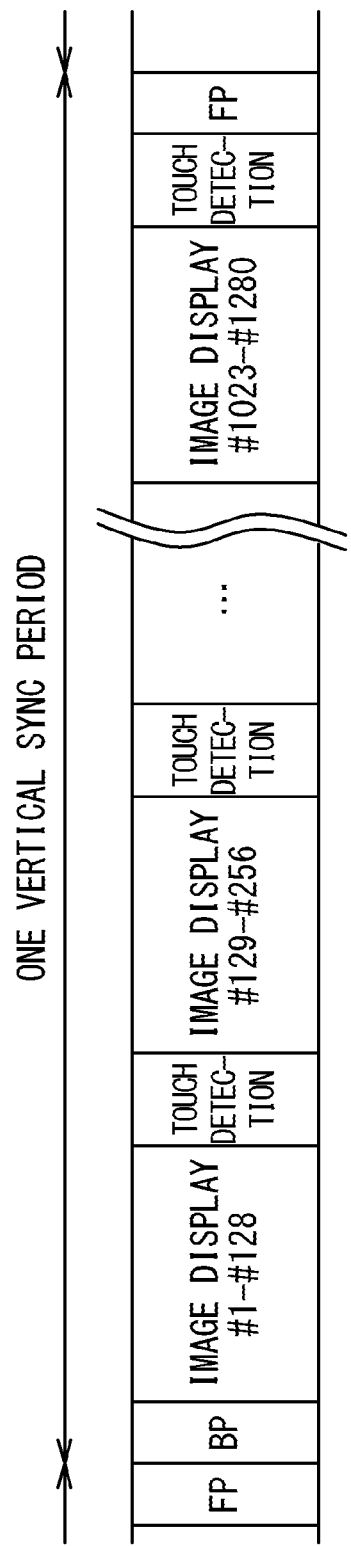
FIG. 7B is a timing chart showing the operation of the display driver in a long H touch detection mode.

On the other hand, the long H touch detection mode is an operation mode of providing a plurality of special horizontal sync periods for the touch detection in each vertical sync period. FIG. 7B is a timing chart showing the operation of the display driver 2 in the long H touch detection mode. In the Long H touch detection mode, too, each vertical sync period has a vertical back porch (BP) period, an image display period and a vertical front porch (FP) period. However, in the long H touch detection mode, a plurality of "long H periods" which are special horizontal sync periods having the time duration longer than the other horizontal sync period, are provided in the image display period, and the touch detection is carried out in the "long H period". In the long H period, the pixels 8 of in any line are not driven. In FIG. 7B, the "long H period" when the touch detection is carried out is shown as the explanatory remark of "touch detection". In the image display period of each vertical sync period, one long H period is provided for usual horizontal sync periods (the horizontal sync periods during which the pixels 8 of a selected line are driven) of a predetermined number. FIG. 7B shows the operation of the display driver in which one "long H period" is provided for every 128 horizontal sync periods in the image display period.

Note that the latency of the image data is not constant due to the existence of the long H period in the long H touch detection mode while the latency of the image data in the display driver 2 is constant regardless of the line (that is, a delay from the time when the image data of each line is transmitted to the display driver 2 to the time when the pixels 8 of each line are actually driven according to the image data of each line) in the touch detection inexecution mode and the V blank touch detection mode. Therefore, the operation of the display driver 2 driving the display panel 1 when the display driver 2 is set to the touch detection inexecution mode or the V blank touch detection mode is different from the operation of the display driver 2 driving the display panel 1 when the display driver 2 is set to the long H touch detection mode.

Figure 8A:
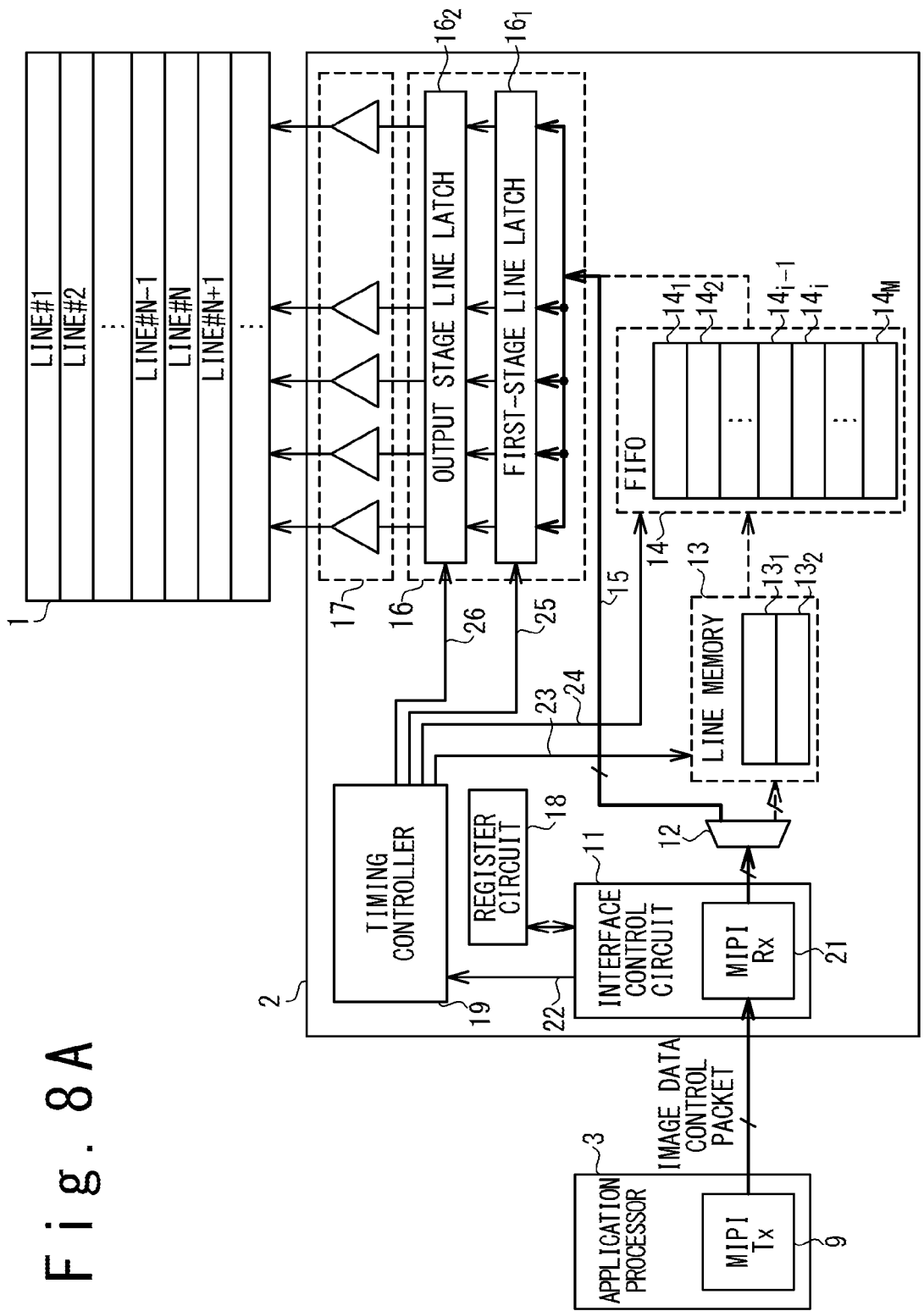
FIG. 8A is a block diagram schematically showing the operation of the display driver when being set to the touch detection inexecution mode or the V blank touch detection mode.

FIG. 8A is a block diagram schematically showing the operation of the display driver 2 when the display driver is set to the touch detection inexecution mode or the V blank touch detection mode. FIG. 8A shows the operation of the display driver 2 in which the occurrence of transmission error is not detected. Note that the operation of the display driver 2 when the occurrence of transmission error is detected will be described in detail later with reference to FIG. 8B.

The line memory circuit 13 and the FIFO circuit 14 are not used in consideration that the latency of the image data is constant in the touch detection inexecution mode and the V blank touch detection mode. The operations of the line memory circuit 13 and the FIFO circuit 14 are stopped. The selector 12 selects the bypass data bus 15, and the image data are transmitted to the line latch circuit 16 through the bypass data bus 15. It is effective for the reduction of consumed power to stop the operations of the line memory circuit 13 and the FIFO circuit 14 in the touch detection inexecution mode and the V blank touch detection mode.

In detail, when the display driver 2 is set to the touch detection inexecution mode or the V blank touch detection mode, the bypass data bus 15 is selected by the selector 12. When the image data is sequentially transmitted to the display driver 2 by the long packet, and received by the MIPI receiver 21 of the interface control circuit 11, the received image data are sequentially sent to the line latch circuit 16 through the bypass data bus 15. The transmission of the image data from the interface control circuit 11 to the line latch circuit 16 is carried out for every predetermined number of pixels 8 (for example, one pixel 8) (not every line).

The first-stage line latch $16_1$ of the line latch circuit 16 receives and stores the image data sequentially transmitted from the interface control circuit 11 through the bypass data bus 15. The output stage line latch $16_2$ latches the image data from the first-stage line latch $16_1$ at the start of each horizontal sync period. The pixels 8 of the selected line are driven according to the image data latched by the output stage line latch $16_2$ at the start of each horizontal sync period in the image display period of each horizontal sync period.

In detail, when each horizontal sync period is started, the lines of the pixels 8 to be driven by the gate driver circuit 5 are selected in the display panel 1, and the gate lines 6 corresponding to the selected lines are activated. Moreover, the strobe signal 26 is activated, and the output stage line latch $16_2$ latches the image data stored in the first-stage line latch $16_1$. The source driver circuit 17 drives the pixels 8 of the selected lines. That is, in the present embodiment, in the horizontal sync period in which the pixels 8 of some line are driven, the image data corresponding to the pixels 8 of the concerned lines are latched by the output stage line latch $16_2$, and the pixels 8 of the selected lines are driven according to the image data latched by the output stage line latch $16_2$.

Here, when the occurrence of transmission error is detected in the data transmission about some object line, the pixels 8 of the object line are driven based on the image data of immediately before line about which the data transmission has been carried out immediately before the data transmission about the object line. In the touch detection inexecution mode or the V blank touch detection mode, such an operation is realized by not carrying out the activation of the strobe signal 26 in the horizontal sync period in which the pixels 8 of the object line are driven, that is, by not updating the output stage line latch $16_2$.

Figure 8B:
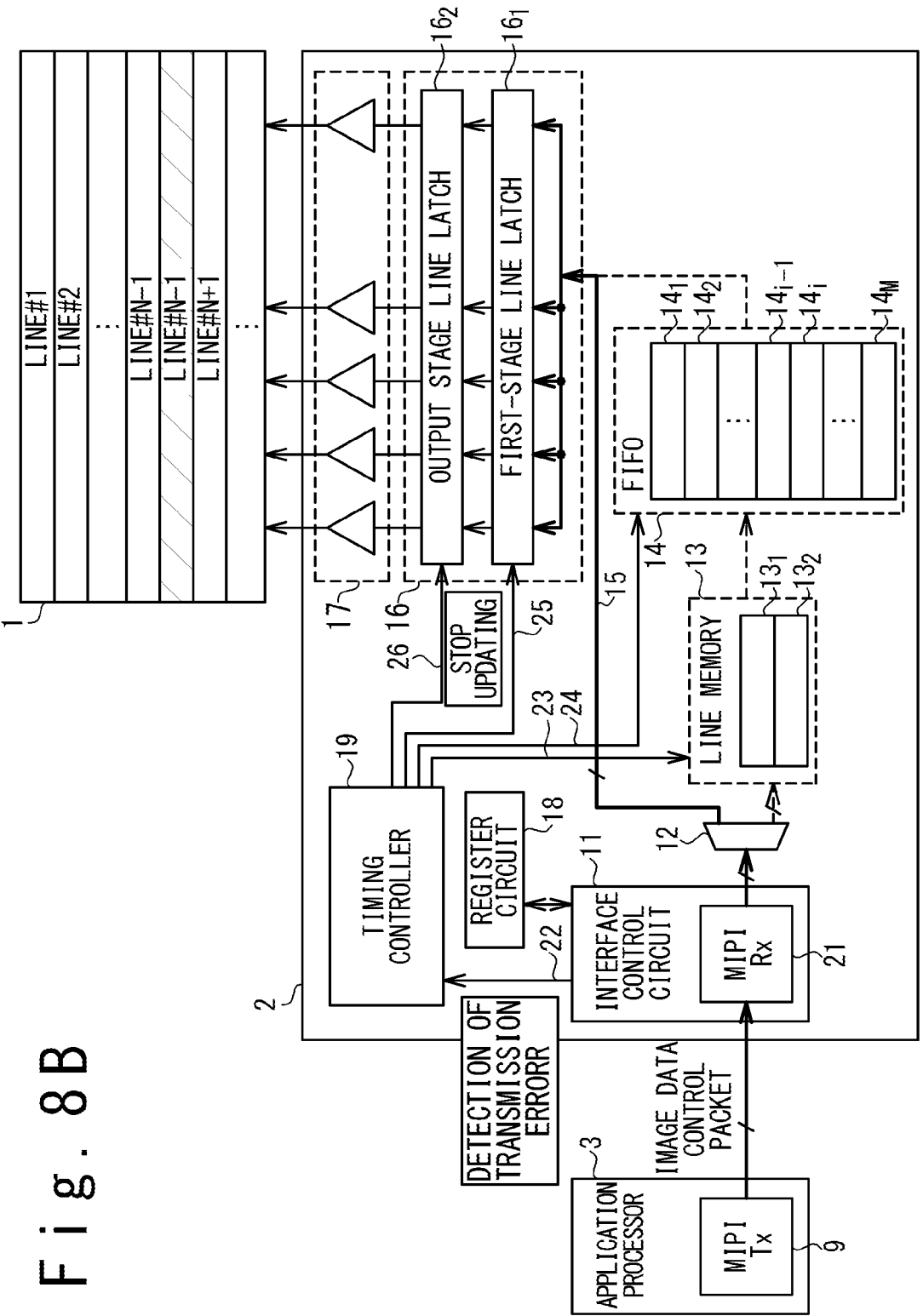
FIG. 8B is a block diagram showing the operation of the display driver when the display driver is set to the touch detection inexecution mode or the V blank touch detection mode, and the occurrence of transmission error has been detected in the data transmission about a line #N.

FIG. 8B is a block diagram showing the operation of the display driver 2 when the display driver 2 is set to the touch detection inexecution mode or the V blank touch detection mode, and the occurrence of transmission error is detected in the data transmission about the line #N.

Note that the occurrence of transmission error in the data transmission about the line #N can contain the following events of (a) to (d):

(a) the occurrence of transmission error of the Hsync Start packet which is transmitted as a short packet;

(b) the occurrence of transmission error in transmission of a long packet that transmits image data;

(c) the undesired switching of the clock lane to the LP mode; and (d) the undesired shift of the data lane to the LP mode.

When the occurrence of transmission error is detected in the data transmission about the line #N (that is, when the occurrence of either of the above events (a) to (d) is detected), the MIPI receiver 21 activates the transmission error detection signal 22. The timing controller 19 recognizes the occurrence of transmission error in the data transmission about the line #N through the activation of transmission error detection signal 22. When the occurrence of transmission error is recognized in the data transmission about the line #N, the timing controller 19 does not activate the strobe signal 26 in the back porch period of the horizontal sync period of driving the pixels 8 of the line #N. In the horizontal sync period in which the pixels 8 of the line #N are driven, the output stage line latch $16_2$ is not updated. The image data of the line #N−1, the data transmission of which has been carried out immediately before the data transmission about the line #N, remain in the output stage line latch $16_2$. As a result, the pixels 8 of the line #N are driven in response to the image data of the line #N−1. In FIG. 8B, the pixels 8 of the line #N driven in response to the image data of the line #N−1 are shown by the hatching assigned to the display panel 1.

Figure 9:
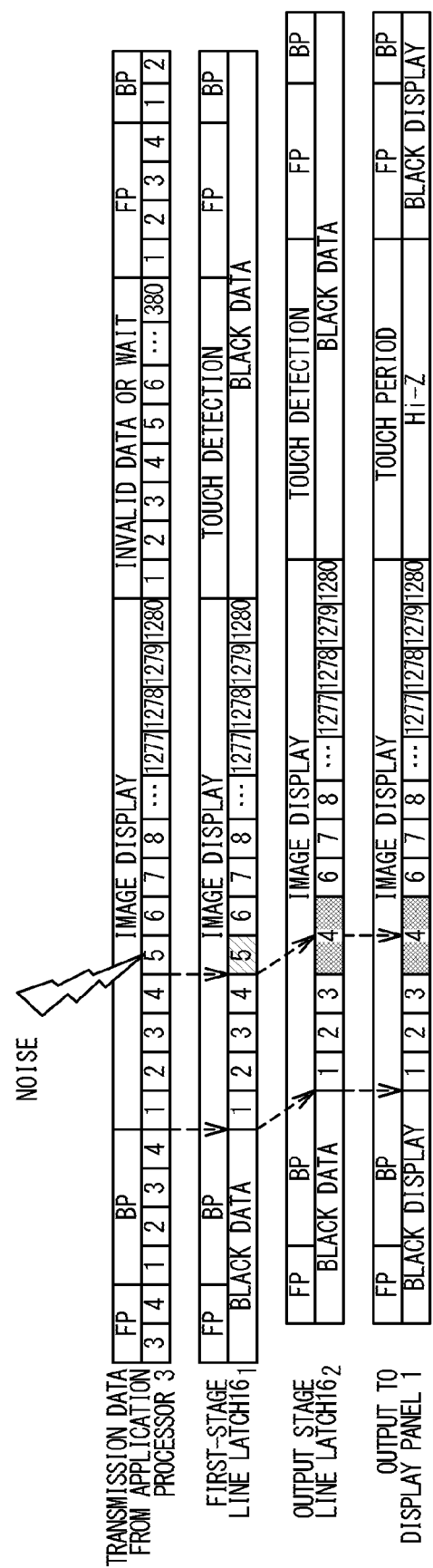
FIG. 9 is a timing chart showing the operation of the display driver when the display driver is set to the touch detection inexecution mode or the V blank touch detection mode, and the occurrence of transmission error is detected in a data transmission about a line #5.

FIG. 9 is a timing chart showing the operation of the display driver 2 specifically in case of N=5, namely, when the occurrence of transmission error is detected in the data transmission about the line #5. As shown in FIG. 9, the image data of the lines #1, #2, #3, #4, #5 . . . are sequentially stored in the first-stage line latch $16_1$ of the line latch circuit 16. Here, because the transmission error occurs in the data transmission about the line #5, the image data of the line #5 stored in the first-stage line latch $16_1$ is not normal image data.

Figure 10:
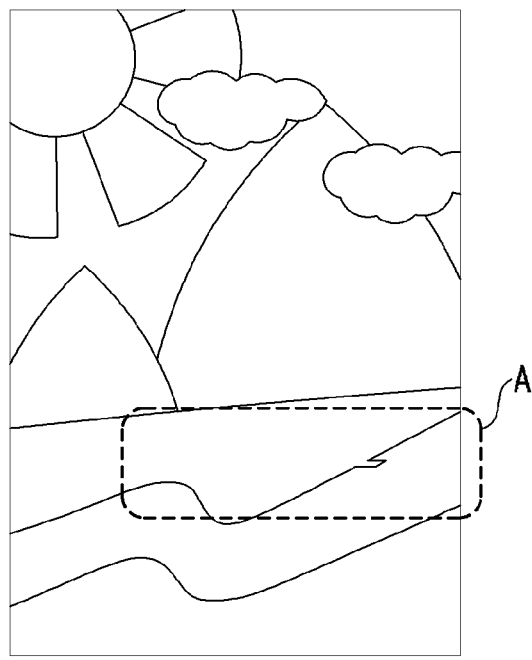
FIG. 10 is a diagram showing an example in which the image distortion caused by the transmission error is restrained in the present embodiment.

On the other hand, in the back porch period of the horizontal sync period in which the pixels 8 of the line #5 are driven, the strobe signal 26 is not activated and the output stage line latch $16_2$ is not updated. In the horizontal sync period in which the pixels 8 of the line #5 are driven, the state that the image data of the line #4 are stored in the output stage line latch $16_2$ is maintained. Therefore, in the horizontal sync period in which the pixels 8 of the line #5 are driven, the pixels 8 of the line #5 are driven in response to the image data of the line #4. Generally, since the image data of the line #5 are similar to the image data of neighbor line #4, the image distortion caused by the transmission error can be effectively restrained according to such an operation. FIG. 10 shows an example that the image distortion caused by the transmission error is restrained by the operation of the display driver 2 of the present embodiment in the same image as in FIG. 1. Though the linear image distortion exists in a part A of the display image of FIG. 1, it becomes difficult to recognize the image distortion in the display image of FIG. 10 in which the image data of a neighbor line is used, in case of driving the pixels of the line in which the transmission error has occurred.

Figure 11A:
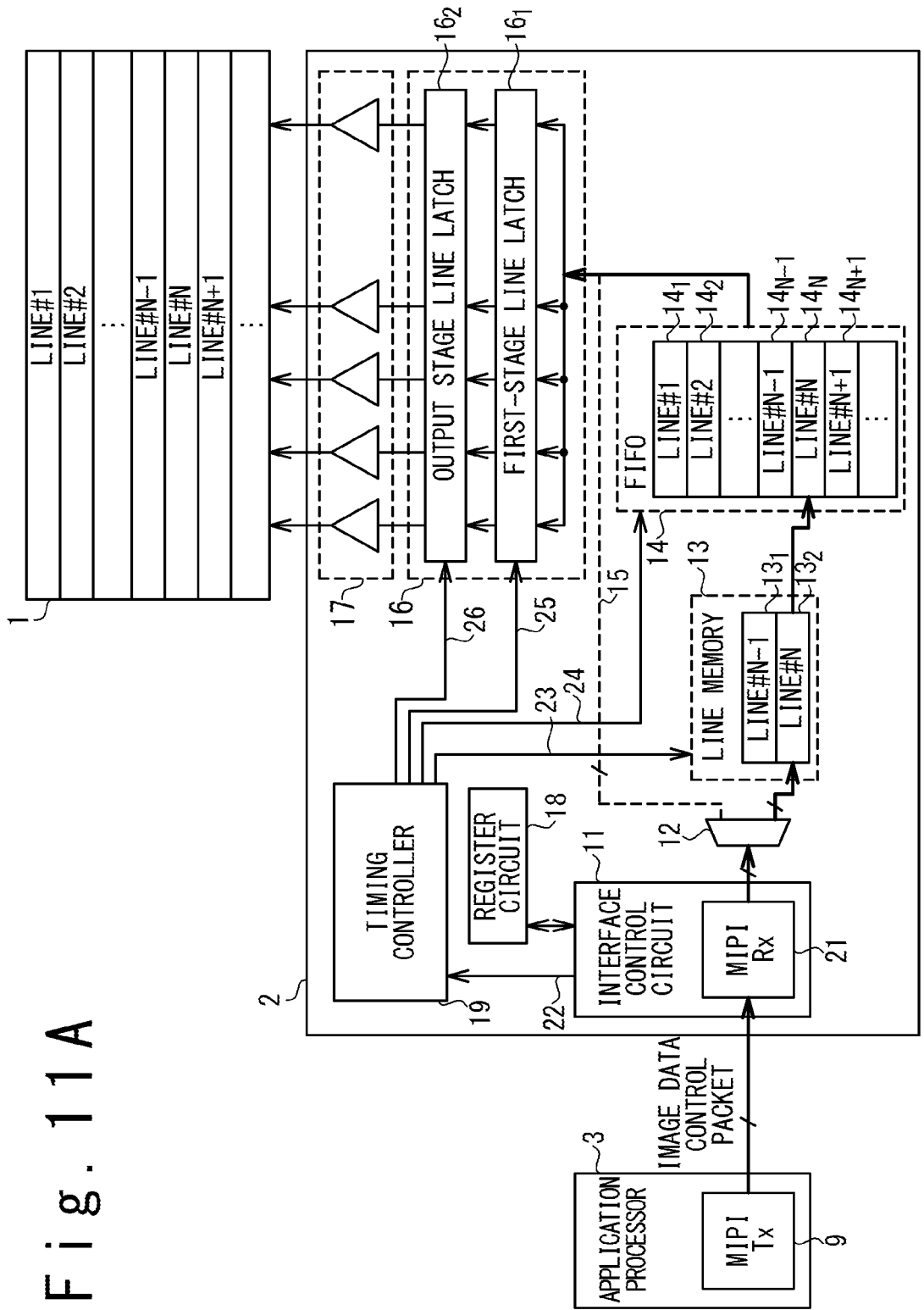
FIG. 11A is a block diagram schematically showing the operation of the display driver when being set to the long H touch detection mode.

On the other hand, FIG. 11A is a block diagram schematically showing the operation of the display driver 2 when being set to the long H touch detection mode. FIG. 11A shows the operation of the display driver 2 in which the occurrence of transmission error is not detected. Note that the operation of the display driver 2 when the occurrence of transmission error is detected will be described later in detail with reference to FIG. 11B.

In the long H touch detection mode, the latency of the image data is variable, and the change of the latency is absorbed through the operation of the line memory circuit 13 and the FIFO circuit 14. The selector 12 selects the line memory circuit 13, and the image data are transmitted to the line latch circuit 16 through the line memory circuit 13 and the FIFO circuit 14.

In detail, when the display driver 2 is set to the long H touch detection mode, the line memory circuit 13 is selected by the selector 12. The image data are sequentially transmitted to the display driver 2 by the long packet, and when received by the MIPI receiver 21 of the interface control circuit 11, the received image data are sequentially sent to the line memory circuit 13.

In each horizontal sync period, one of the two memory areas $13_1$ and $13_2$ of the line memory circuit 13 receives the image data from the interface control circuit 11, and the other transmits the image data to the FIFO circuit 14. In other words, each of the memory areas $13_1$ and $13_2$ temporarily stores the image data of alternate line, and transmits the stored image data to the FIFO circuit 14.

Below, the description is given on the assumption that the memory area $13_1$ is used to the store the image data of odd-numbered lines, and the memory area $13_2$ is used to store the image data of even-numbered lines, when the occurrence of transmission error is not detected. That is, in some vertical sync period, the image data of the line #1 are first transmitted to the line memory circuit 13 from the interface control circuit 11. At this time, the pointer 23 is set to the first state, and the image data of the line #1 are written in the memory area $13_1$. Next, the image data of the line #2 are transmitted to the line memory circuit 13 from the interface control circuit 11. At this time, the pointer 23 is updated and is set to the second state. Thus, the image data of the line #2 are written in the memory area $13_2$, and the image data of the line #1 are read from the memory area $13_1$ and are transmitted to the FIFO circuit 14. Moreover, the image data of the line #3 are transmitted to the line memory circuit 13 from the interface control circuit 11. At this time, the pointer 23 is updated and is set to the first state again. The image data of the line #3 are written in the memory area $13_1$, and the image data of the line #2 are read from the memory area $13_2$ and are transmitted to the FIFO circuit 14. Hereinafter, by the similar procedure, the image data of each line are transmitted to the line memory circuit 13 from the interface control circuit 11, and then are transmitted to the FIFO circuit 14. Which of the memory areas $13_1$ and $13_2$ receives the image data from the interface control circuit 11, and which of them transmits the image data to the FIFO circuit 14 are specified by the pointer 23 supplied from the timing controller 19.

The FIFO circuit 14 delays the image data of each line sent from the line memory circuit 13 by the horizontal sync periods of the same number M as the number of memory areas 141 to 14M in the reception order from the line memory circuit 13 and then transmits to the line latch circuit 16. When the occurrence of transmission error is not detected, the image data of the lines #1, #2, #3, #4 . . . #N−1, #N . . . are transmitted to the FIFO circuit 14 from the line memory circuit 13 in this order, and transmitted to the line latch circuit 16 from the FIFO circuit 14 in this order.

The first-stage line latch $16_1$ of the line latch circuit 16 sequentially receives the image data transmitted from the FIFO circuit 14 and stores therein. The output stage line latch $16_2$ latches the image data from the first-stage line latch $16_1$ in case of the start of each horizontal sync period. In the image display period of each horizontal sync period, the pixels 8 of a selected line are driven according to the image data latched by the output stage line latch $16_2$ in case of the start of each horizontal sync period.

In detail, when each horizontal sync period is started, the lines of the pixels 8 to be driven by the gate driver circuit 5 are selected in the display panel 1, and the gate lines 6 corresponding to the selected lines are activated. Moreover, the strobe signal 26 is activated in synchronization with the start of the horizontal sync period, and the output stage line latch $16_2$ latches the image data stored in the first-stage line latch $16_1$. The source driver circuit 17 drives the pixels of the selected line. That is, in the long H touch detection mode, too, the image data corresponding to the pixels 8 of the concerned line are latched by the output stage line latch $16_2$ in the horizontal sync period in which the pixels 8 of some line are driven, and the pixels 8 of the line selected according to the image data latched by the output stage line latch $16_2$ are driven.

However, when the occurrence of transmission error is detected in the data transmission about some object line, the pixels 8 of the object line are driven based on the image data of the immediately before line, about which the data transmission has been carried out immediately before the data transmission about the object line. In the long H touch detection mode, such an operation is realized by transmitting the image data of the immediately before line (the line about which the data transmission has been carried out immediately before the data transmission about the object line) to the FIFO circuit 14 from the line memory circuit 13, instead of the image data of the object line, when the occurrence of transmission error is detected in the data transmission about some object line.

Figure 11B:
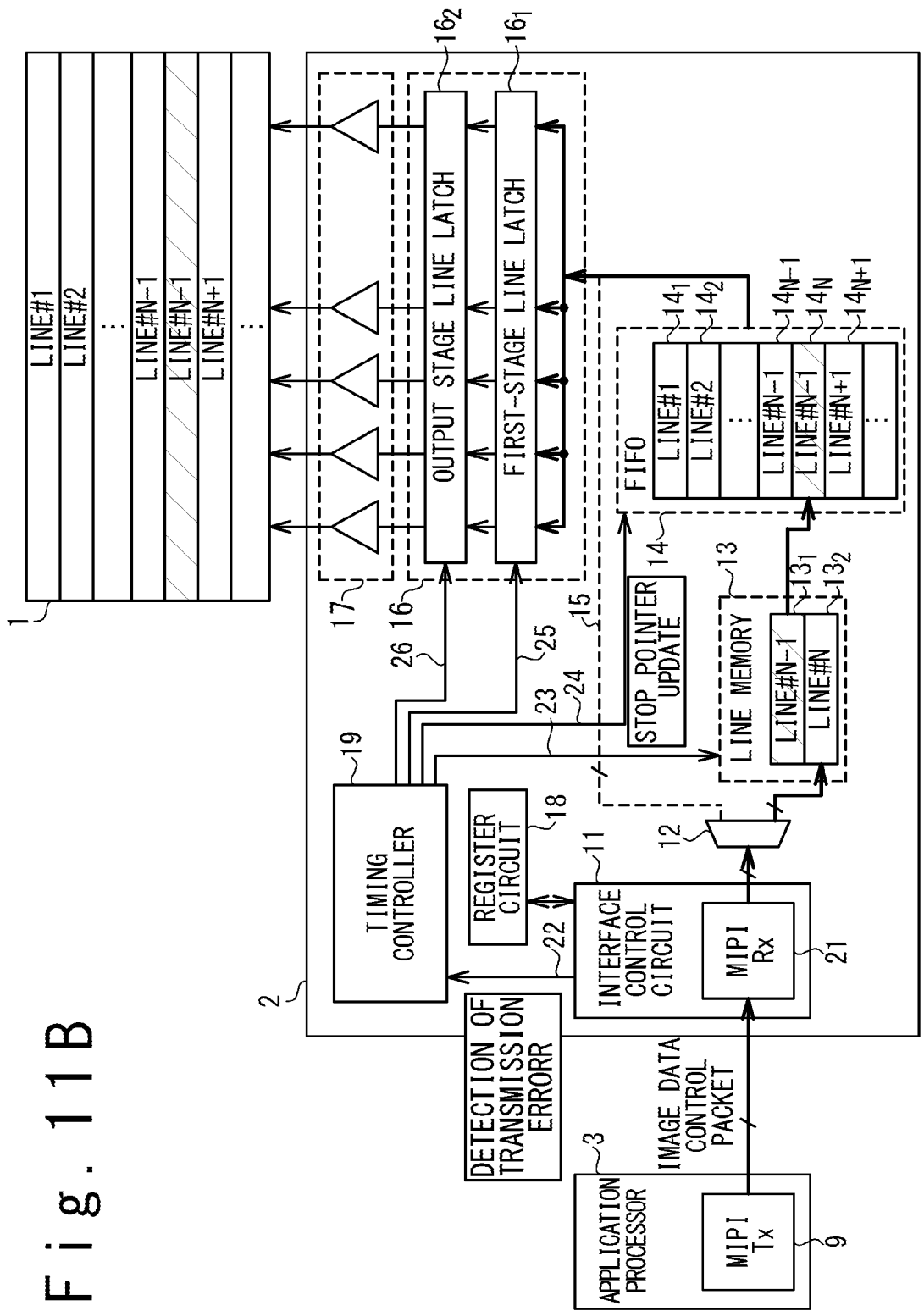
FIG. 11B is a block diagram showing the operation of the display driver when the display driver is set to the long H touch detection mode, and the occurrence of transmission error is detected in the data transmission about the line #N.

FIG. 11B is a block diagram showing the operation of the display driver 2 when the display driver 2 is set to the long H touch detection mode, and the occurrence of transmission error has been detected in the data transmission about the line #N.

When detecting the occurrence of transmission error in the data transmission about the line #N, the MIPI receiver 21 activates the transmission error detection signal 22. The timing controller 19 recognizes the occurrence of transmission error in the data transmission about the line #N in response to the activation of the transmission error detection signal 22. When recognizing the occurrence of transmission error in the data transmission about the line #N, the timing controller 19 does not update the pointer 23 at the timing at which the image data used for driving of the pixels 8 of the line #N are sent from the line memory circuit 13 to the FIFO circuit 14, and maintains the state of the pointer 23 at the timing at which the image data of the line #N−1 are sent from the line memory circuit 13 to the FIFO circuit 14. Thus, the image data are read from not the memory area ($13_1$ or $13_2$) in which the image data of the line #N have been stored but the memory area (13₂ or 13₁) in which the image data of the line #N−1 have been stored. Thus, the image data of the line #N−1 are sent to the FIFO circuit 14 instead of the image data of the line #N. At this time, the image data of the line #N+1 are written in the memory area (13₁ or 13₂) in which the image data of the line #N have been stored. After that, in the next horizontal sync period, the image data of the line #N+1 are sent from the line memory circuit 13 to the FIFO circuit 14.

The FIFO circuit 14 transmits the image data of each line to the line latch circuit 16 in the reception order from the line memory circuit 13. In the first-stage line latch 16₁ and the output stage line latch 16₂ of the line latch circuit 16, the image data of each line are stored in the transmission order to the line latch circuit 16 from FIFO circuit 14. As a result, the pixels 8 of the line #N are driven according to the image data of the line #N−1. In FIG. 11B, the pixels 8 of the line #N which are driven in response to the image data of the line #N−1 are shown by hatching to the display panel 1.

Figure 12:
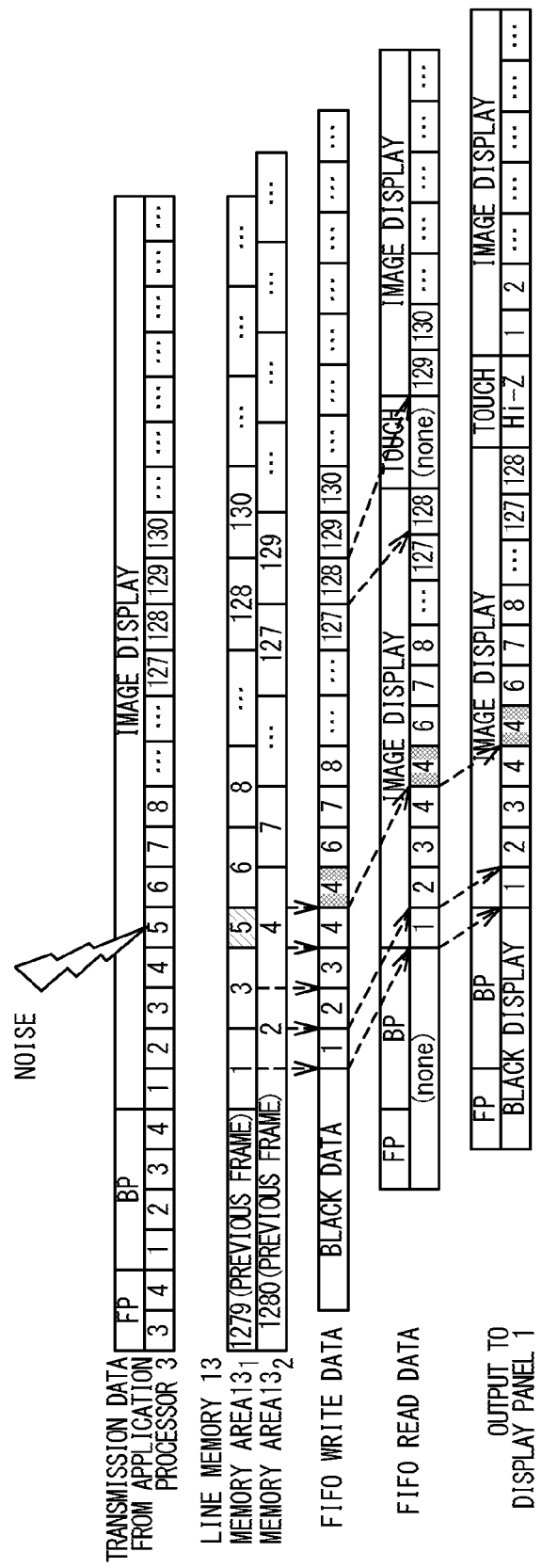
FIG. 12 is a timing chart showing the operation of the display driver when the display driver is set to the long H touch detection mode, and the occurrence of transmission error is detected in the data transmission about the line #5.

FIG. 12 is a timing chart showing the operation of the display driver 2, more specifically, in case of N=5, that is, when the occurrence of transmission error has been detected in the data transmission about the line #5. As shown in FIG. 12, when the image data of each line are transmitted to the display driver 2 from the application processor 3, the image data of each line are transmitted to the line memory circuit 13 from the interface control circuit 11. The image data of the lines #1, #3, #5 are sequentially stored in the memory area 13₁ of the line memory circuit 13, and the image data of the lines #2, #4, #5 are sequentially stored in the memory area 13₂ of the line memory circuit 13.

In the transmission of the image data of the lines #1 to #4 from the interface control circuit 11 to the line memory circuit 13 and the transmission to the FIFO circuit from the FIFO circuit 14 and the line memory circuit 13, the state of the pointer 23 is changed in each horizontal sync period and the image data of each line are alternately written in the memory areas 13₁ and 13₂. Also, it is alternately read. At the timing when the image data of the line #4 are transmitted to the FIFO circuit 14, the pointer 23 is set so that the image data transmitted from the interface control circuit 11 are written in the memory area 13₁, and the image data read from the memory area 13₂ are transmitted to the FIFO circuit 14. As a result, the image data of the line #5 are stored in the memory area 13₁. Here, since the transmission error occurs in the data transmission about the line #5, the image data of the line #5 stored in the memory area 13₁ are not normal image data.

At the timing when the image data used for driving the pixels 8 of the line #5 are transmitted to the FIFO circuit 14 in response to the detection of the occurrence of transmission error about the line #5, the updating of the pointer 23 is not carried out. Therefore, the image data of the line #4 are read from the memory area 13₂ once again and are transmitted to the FIFO circuit 14. At this time, the image data of the line #6 are written in the memory area 13₁.

In the following operation, the state of the pointer is changed in each horizontal sync period, and the image data of each line are alternately written in the memory areas 13₁ and 13₂ and also are alternately read. In detail, the image data of the line #6 are read from the memory area 13₁ and the image data of the line #7 are written in the memory area 13₂. Next, the image data of the line #7 are read from the memory area 13₂ and the image data of the line #8 are written in the memory area 13₁.

As the result of such an operation, in the horizontal sync period in which the pixels 8 of the line #5 are driven, the pixels 8 of the line #5 are driven in response to the image data of the line #4. Generally, since the image data of the line #5 are similar to the image data of neighbor line #4, the image distortion caused by the transmission error can be effectively restrained according to such an operation.

As described above, when the display driver 2 of the present embodiment is set to the long H touch detection mode, too, the image distortion caused by the transmission error can be effectively restrained.

In the above description, the embodiments of the present invention have specifically described but the present invention is not limited to the above-mentioned embodiments. It could be understood to the skilled person that the present invention can be implemented with various change or modifications.

For example, in the present embodiment, when the long H touch detection mode is not prepared for the display driver 2, it is not necessary to prepare the selector 12, the line memory circuit 13 and the FIFO circuit 14 for the display driver 2. In the same way, when the touch detection inexecution mode and the V blank touch detection mode are not prepared for the display driver 2, it is not necessary to prepare the selector 12 and the bypass data bus 15 for the display driver 2. In this case, the image data of all the lines are transmitted to the line latch circuit 16 from the interface control circuit 11 through the line memory circuit 13 and the FIFO circuit 14.

What is claimed is:

1. A display driver comprising:
a receiver configured to:
receive first image data for a first line and second image data for a second line of a display panel;
detect occurrence of a transmission error within the second image data; and
a timing controller configured to cause a latch line circuit to output the first image data of the first line to a driving circuit section in response to the detection of the occurrence of the transmission error,
wherein the driving circuit section is configured to drive the second line with the first image data, wherein the first line is driven prior to the second line.

2. The display driver of claim 1, wherein the second line is driven sequentially after the first line.

3. The display driver of claim 1 further comprising:
a storage circuit configured to transmit the first image data of the first line to the line latch circuit in response to the detection of the occurrence of the transmission error within the second image data.

4. The display driver of claim 3 further comprising:
a line memory circuit configured to transmit the first image data of the first line to the storage circuit in response to the detection of the occurrence of the transmission error in the second image data.

5. The display driver of claim 4, wherein the receiver is further configured to:
receive third image data for a third line of the display panel; and
overwrite the second image data in the line memory with the third image data, wherein the driving circuit section is configured to drive the third line with the third image data.

6. The display driver of claim 3, wherein in a first operation mode, the receiver is further configured to transmit the first image data of the first line to the line latch circuit bypassing the storage circuit, and in a second operation mode, the receiver is further configured to transmit the first image data of the first line to a line memory circuit.

7. The display driver of claim 3, wherein the timing controller is further configured to:
control the storage circuit to transmit the first image data of the first line to the line latch circuit in response to the detection of the occurrence of the transmission error.

8. The display driver of claim 1, wherein in a first operation mode, the display driver is configured operate one or more detection electrodes for capacitive sensing during a vertical sync period, and in a second operation mode, the display driver is configured to operate the one or more detection electrodes for capacitive sensing during horizontal sync periods.

9. A method for operating a display apparatus, the method comprising:
receiving, by a receiver, first image data for a first line and second image data for a second line of a display panel;
detecting, by the receiver, occurrence of a transmission error within the second image data;
outputting, by a latch line circuit in response response to a signal from a timing controller, the first image data of the first line to a driving circuit section in response to the detection of the occurrence of the transmission error; and
driving, by the driving circuit section, the second line with the first image data, wherein the first line is driven prior to the second line.

10. The method of claim 9 further comprising:
transmitting, by a storage circuit, the first image data of the first line to the latch line circuit in response to the detection of the occurrence of the transmission error.

11. The method of claim 10 further comprising:
transmitting, by a line memory circuit, the first image data of the first line to the storage circuit in response to the detection of the occurrence of the transmission error.

12. The method of claim 10 further comprising:
in a first operation mode, transmitting, by the receiver, the first image data of the first line to the line latch circuit bypassing the storage circuit; and
in a second operation mode, transmitting, by the receiver, the first image data of the first line to a line memory circuit.

13. The method of claim 9 further comprising:
in a first operation mode, operating one or more detection electrodes for capacitive sensing during a vertical sync period; and
in a second operation mode, operating the one or more detection electrodes for capacitive sensing during horizontal sync periods.

14. A display apparatus comprising:
a display panel comprising a first line and a second line; and
a display driver comprising:
a receiver configured to:
receive first image data for the first line and second image data for the second line;
detect occurrence of a transmission error within the second image data; and
a timing controller configured to cause a latch line circuit to output the first image data of the first line to a driving circuit section in response to the detection of the occurrence of the transmission error,
wherein the driving circuit section is configured to drive the second line with the first image data, wherein the first line is driven prior to the second line.

15. The display apparatus of claim 14, wherein the display driver further comprises:
a storage circuit configured to transmit the first image data of the first line to the line latch circuit in response to the detection of the occurrence of the transmission error.

16. The display apparatus of claim 15, wherein the display driver further comprises:
a line memory circuit configured to:
transmit the first image data of the first line to the storage circuit in response to the detection of the occurrence of the transmission error.

17. The display apparatus of claim 14 further comprising one or more detection electrodes, wherein, in a first operation mode, the display driver is configured operate the one or more detection electrodes for capacitive sensing during a vertical sync period; and in a second operation mode, the display driver is configured to operate the one or more detection electrodes for capacitive sensing during horizontal sync periods.

* * * * *